United States Patent
Breinlinger

(10) Patent No.: US 6,744,393 B2
(45) Date of Patent: Jun. 1, 2004

(54) LOW COST MULTI-RANGE INPUT CIRCUIT FOR INDUSTRIAL ANALOG INPUT MODULES

(75) Inventor: Richard H. Breinlinger, Hampsted, NH (US)

(73) Assignee: Schneider Automation Inc., North Andover, MA (US)

( * ) Notice: Subject to any disclaimer, the term of this patent is extended or adjusted under 35 U.S.C. 154(b) by 195 days.

(21) Appl. No.: 10/037,039

(22) Filed: Dec. 21, 2001

(65) Prior Publication Data
US 2003/0117304 A1 Jun. 26, 2003

(51) Int. Cl.[7] .................................................. H03M 1/12
(52) U.S. Cl. ...................... 341/155; 341/118; 341/120; 361/56; 361/119
(58) Field of Search ........................ 341/155, 188, 341/120, 126, 118; 361/56, 119, 91

(56) References Cited

U.S. PATENT DOCUMENTS

| | | | |
|---|---|---|---|
| 5,373,410 A | * | 12/1994 | Schreiber et al. ............. 361/56 |
| 5,539,406 A | * | 7/1996 | Kouno et al. ................. 341/155 |
| 6,285,308 B1 | * | 9/2001 | Thies et al. .................. 341/155 |

* cited by examiner

Primary Examiner—Michael Tokar
Assistant Examiner—Lam T. Mai
(74) Attorney, Agent, or Firm—Larry I. Golden

(57) ABSTRACT

Analog input module for a programmable logic controller, the analog input module having an input circuit with terminals for accepting either a single voltage range or a single current range from process control sensors. The analog input module includes an analog-to-digital converter and an input circuit with an output terminal connected to the input of the analog-to-digital converter, a voltage input terminal, a current input terminal, and a common terminal. The input circuit is configured to accept a voltage input between the voltage input terminal and the common terminal, to accept a current input between the current input terminal and the common terminal, and to provide an output voltage at the output terminal dependent upon either the voltage input or the current input, without switching or configuring between them.

19 Claims, 3 Drawing Sheets

LOW COST MULTI-RANGE INPUT CIRCUIT FOR INDUSTRIAL ANALOG INPUT MODULES

BACKGROUND OF THE INVENTION

1. Field of the Invention

The present invention relates to an input circuit for an analog input module used to process an analog input signal from a process control sensor to provide an input signal for a Programmable Logic Controller (PLC).

2. Discussion of the Background

Methods of controlling industrial processes have evolved from the beginning of industrial manufacture at the end of the nineteenth century up to the present day. To begin with, each step of a process had to be carried out by a human operator, with or without the aid of a machine. Later, systems for automatic control evolved, at first using purely mechanical means, and later using electrical control systems. With the advent of digital logic, and then computers, analog electrical control systems have largely given way to digital systems. Modern process control systems are typically controlled by a programmable logic controller (PLC). A PLC is essentially a computer containing a Central Processing Unit (CPU) and memory. A PLC may be programmed typically from a terminal or from a general purpose computer. A PLC also has inputs provided for signals derived from sensors and outputs provided to control actuators. The sensors may measure process control variables such as pressure, temperature, flow rates, pH, oxygen content or any number of other variables from which proper operation of a process may depend. The actuators may, for example, control valves, solenoids or the like. Process control systems employing a PLC may be used to control any type of process in automotive plants, printing plants, breweries, or any other type of industry, and lower cost systems may be employed for home automation. Although the PLC is a digital device, the sensors and actuators employed in the process control system are often analog devices. For example, a pressure or temperature sensor may produce a voltage or current which varies continuously, i.e., in an analog fashion, dependent upon the quantity measured. Similarly, an actuator may, for example, control the position of a valve to regulate a flow dependent upon a value of an analog voltage. Analog input and output modules, collectively input/output (I/O) modules, are normally employed to convert the voltages and currents received from the sensors into digital values that can be processed by the PLC, and to convert the digital output values from the PLC into voltages or currents that can be used to control actuators.

An analog input module for a PLC may include an input circuit to convert an input analog voltage or current range to a voltage range suitable for an analog to digital converter, followed by an analog to digital converter, an optical isolator for safety reasons, and then a microcontroller. The microcontroller or any other suitable device provides an input to the PLC. It will be understood by those skilled in the art that an analog input module may be used with a controller other than a PLC, such as a vision controller, an instrument controller, a data acquisition system, motion controller, or any computer. Examples of analog input modules are the Quantum, Kampai and 984 modules produced by Schneider Automation.

A difficulty arises in that several different voltage and/or current ranges may be provided by the different types of analog input sensors. One solution to this problem is to provide different types of analog input modules, each having a different voltage or current input range. A disadvantage with that approach, however, is that a number of different types of modules need to be provided and each one can only be used with certain types of sensors, so that the sensor has to be matched up with the analog input module having the same voltage or current range.

Another solution to this problem is to provide a multi-range analog input module. Such a module has up until now needed a switching mechanism to switch between different input circuits, depending on the voltage or current range to be input to the module. This is further complicated by the fact that it is desirable to control such switching remotely, i.e., from the PLC. The input modules are normally located close to the sensors, which may not be close to the PLC, and which in fact may be in hazardous or otherwise inaccessible locations. This is particularly but not exclusively true in the control of chemical processes, where toxic and/or explosive materials are processed. Consequently, it is desirable for such switching arrangements to be controlled electronically rather than mechanically, which greatly increases the component count in the input circuits and their attendant costs.

SUMMARY OF THE INVENTION

The present invention provides a novel input circuit. According to one embodiment, the input circuit forms part of an analog input module for a programmable logic controller or other control device. The analog input module includes an analog-to-digital converter and an input circuit with an output terminal connected to the input of the analog-to-digital converter, a voltage input terminal, a current input terminal, and a common terminal. The input circuit is configured to accept a voltage input between the voltage input terminal and the common terminal, to accept a current input between the current input terminal and the common terminal, and to provide an output voltage at the output terminal dependent upon either the voltage input or the current input, without switching between them.

A preferred embodiment of an analog input module according to the invention will be further described with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
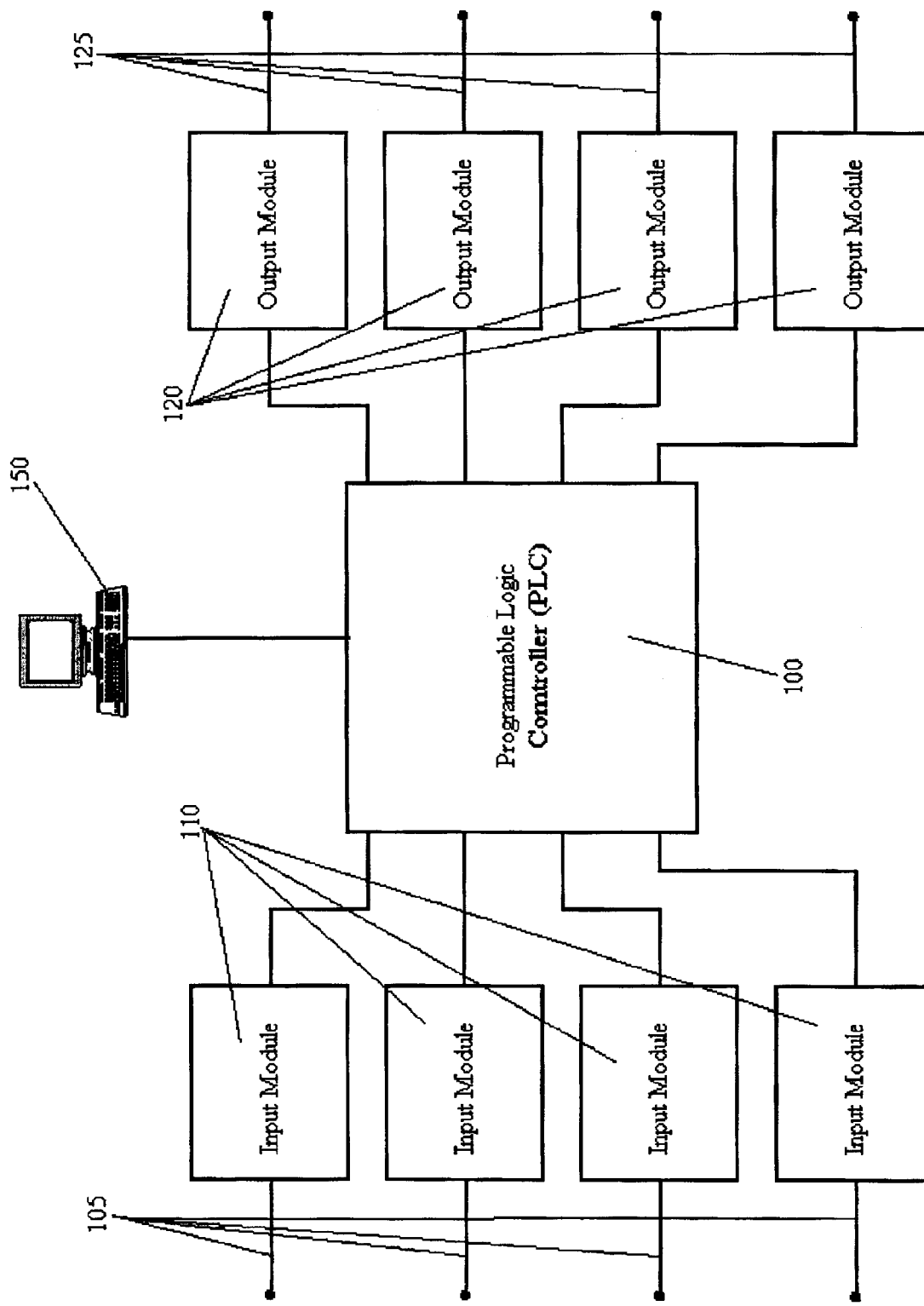
FIG. 1 is a diagram of a simple process control system.

Referring now to the drawings, wherein like reference numerals designate identical or corresponding parts throughout the several views, FIG. 1 is a drawing of a simple process control system. In this system input signals 105 from input sensors are processed by input modules 110 to provide digital signals to programmable logical controller 100. Programmable logic controller (PLC) 100 then provides digital outputs to output modules 120 which provide output signals 125 to actuators. PLC 100 may be programmed from a terminal or a general purpose computer 150.

Figure 2:
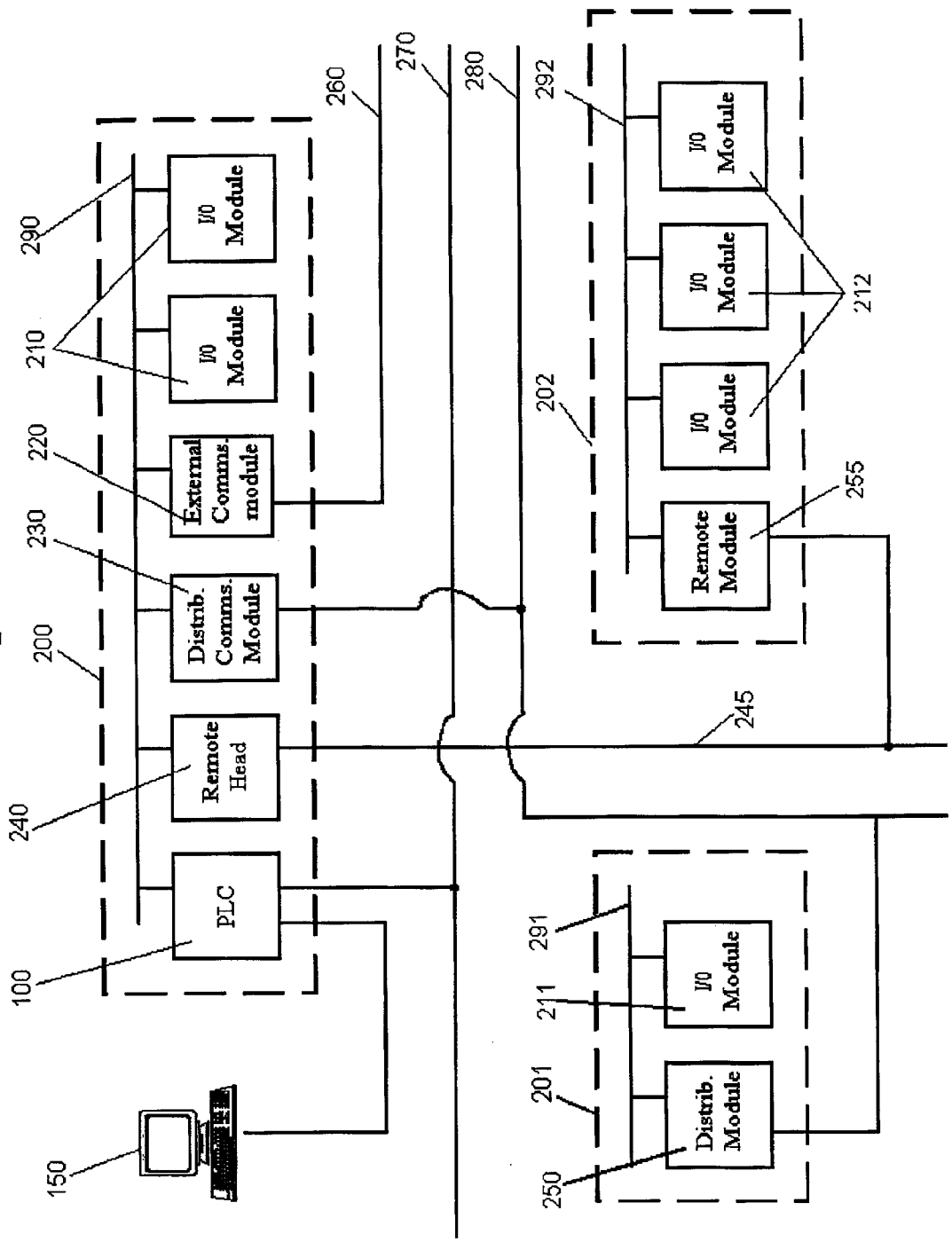
FIG. 2 is a diagram of a more complex process control system.

FIG. 2 shows a more complex process control system, still employing a PLC 100. In this example PLC 100 is mounted in a main rack 200 together with I/O modules 210, an external communications module 220, a distributed communications module 230, remote head 240 and power supplies. Each of the modules in main rack 200 are joined to a main back plane 290, which provides means for signals to flow between the various modules. As in the previous example, PLC 100 is connected to a terminal or general purpose computer 150 for programming. Additionally, PLC 100 may be connected via a local bus 270 to other computer systems in the same plant. PLC 100 is further connected via back plane 290 and external communications module 220 to an external bus 260 for external communications, such as a local area network (LAN), a wide area network (WAN) or the Internet. PLC 100 is further connected through back plane 290 to distributed communications module 230, which in turn is connected to distributed bus 280 to communicate with a plurality of distributed modules 250 in distributed racks 201. Only one distributed module 250 and one distributed rack 201 is shown for the sake of clarity. Each distributed module 250 may be connected through a distributed back plane 291 to a plurality of I/O modules 211. Only one I/O module 211 is shown for the sake of clarity. PLC 100 is also connected through main back plane 290 to a remote head 240 for communication over remote bus 245 with one or more remote modules 255 in remote racks 202. Only one remote module 255 and one remote rack 202 is shown for the sake of clarity. Each remote module 255 may be connected through a remote back plane 292 to a plurality of I/O modules 212.

Figure 3:
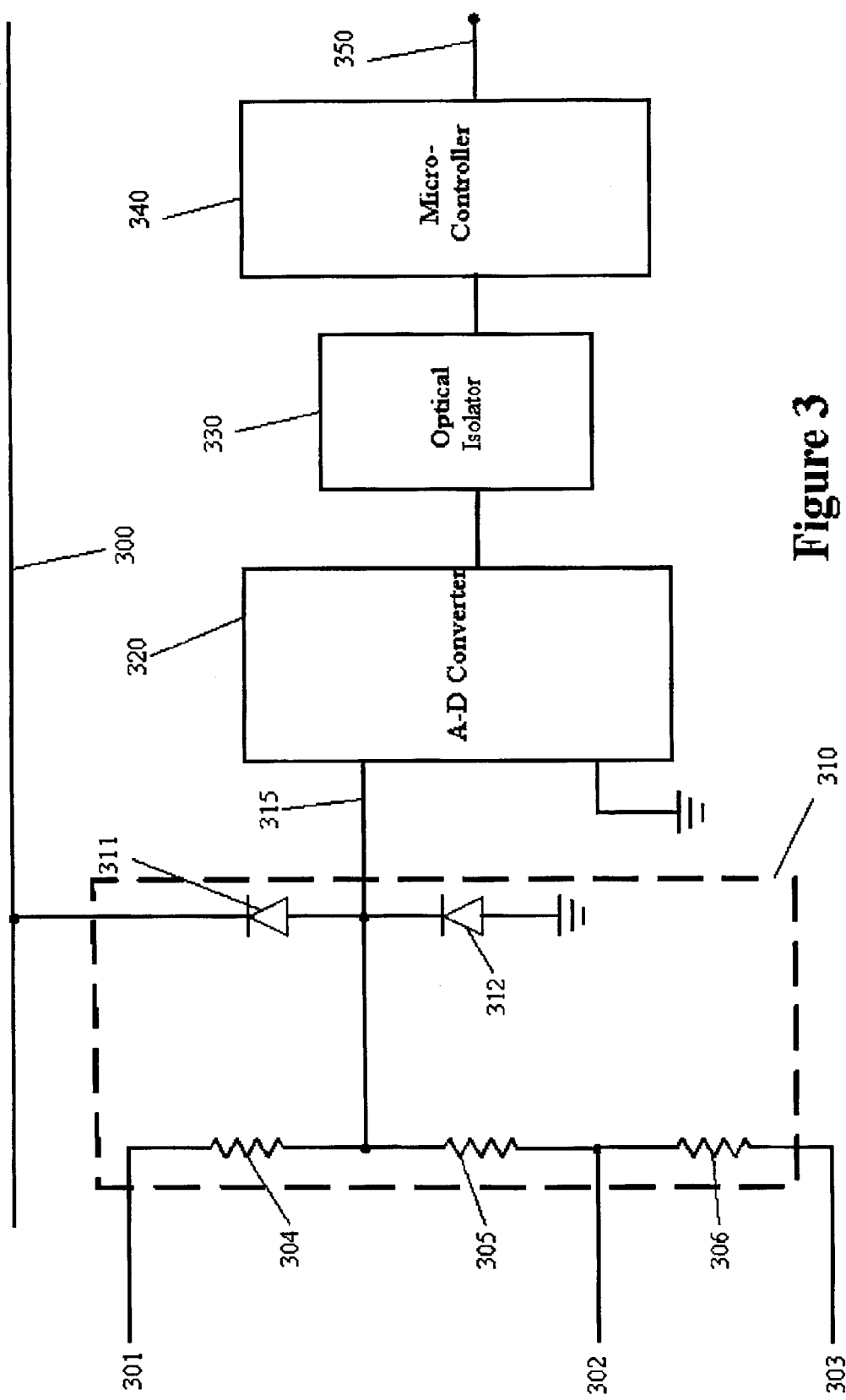
FIG. 3 is a schematic diagram of an analog input module according to one embodiment of the invention.

FIG. 3 illustrates an analog input module according to an embodiment of the invention. In this embodiment an input circuit 310 is provided with a voltage input terminal 301, a current input terminal 302 and a common terminal 303, and is connected to a voltage supply rail 300 and outputs a signal 315 to an analog to digital (A-D) converter 320 which drives an optical isolator 330 and a micro-controller 340 to provide an output 350 to the PLC 100, as shown for example in the arrangements of FIG. 1 or FIG. 2, or in any other suitably configured process control system. Input circuit 310 comprises first, second and third resistors 304, 305 and 306 respectively, and first and second diodes, 311 and 312 respectively. Please note that, for the sake of clarity, not all connections to A-D converter 320, optical isolator 330 and micro-controller 340 are shown.

When the analog input module according to the embodiment is to be used with a sensor that provides a voltage output, the voltage from the sensor is applied between voltage input terminal 301 and common input terminal 303. In this voltage mode of operation first resistor 304 acts as a first leg of a voltage divider, while second and third resistors 305 and 306 in series with one another act as a second leg of the voltage divider. In this way, the voltage from a process sensor having a voltage output is reduced to the input voltage of the A-D converter 320.

When a process sensor providing a current output is used, the current loop is connected between current input terminal 302 and common terminal 303 of the input circuit 310. In this current mode of operation the resistor 305 connects shunt resister 306 to the A-D converter input 315.

First and second diodes 311 and 312 provide clamping of the voltage signal 315 fed from input circuit 310 to A-D converter 320. First diode 311 provides clamping for positive excursions of voltage, while second diode 312 provides clamping for negative excursions of voltage.

In a specific example of the circuit of the embodiment of FIG. 3, first resistor 304 may have a value of 15.3 kilohms (kΩ), second resistor 305 would have a corresponding value of 10 kΩ and third resistor 306 would have a corresponding value of 200 ohms (Ω). With a supply voltage of 4.096 volts (V) on the supply rail 300, the input circuit 310 converts a voltage input of 0–10 V applied between voltage input terminal 301 and common terminal 303 into a voltage suitable for a common type of A-D converter, and alternatively a current input of 0–20 milliamperes (mA) applied between current input terminal 302 and common terminal 303 can also be converted to the same input range suitable for the A-D converter. It will be appreciated by one skilled in the art that other values of resistance may be employed where other voltage and/or current ranges are to be employed, and where the operating voltage of the A-D converter is different.

Although a number of different voltage and current ranges exist for analog process control sensors, the present inventor has found that an analog input module that can be used with one voltage range and one current range is much more useful than a module that can only be used with a single voltage or current range, and can be realized without switching means. This results in a multi-range analog input module that can be produced for virtually the same cost as a single range analog input module. Savings in cost from reducing the component count are further aided by economies of scale from producing only one type of analog input module. Such a dual range voltage/current input module is particularly of interest for use in low cost process control systems such as may be used in smaller industrial plants or in home automation.

In comparison with the background art, the circuit of FIG. 3 has a much lower number of components, reducing both cost and complexity, and simplifying both manufacture, installation and configuration of the analog input module. This enables an analog input module employing the circuit of the preferred embodiment of the invention to be employed in lower cost systems, for example including smaller industrial plants and systems for home automation, where it is generally not economical to employ the same equipment that would be employed in, for example, a major chemical processing plant.

In an environment such as home automation, or in a small industrial plant, it is also highly advantageous that the analog input module of the invention can be set up with a minimum of configuration. The user has only to determine whether the sensor to be connected provides a voltage output or a current output, and connect the sensor to the appropriate terminals of the analog input module. In such environments, a highly skilled technician may not be available to assist in installation, and, for example, the analog input module of the invention could be supplied together with input sensors that provide only a single standard output voltage or a single standard current output for each type of sensor to be used with the system.

Obviously, numerous modifications and variations of the present invention are possible in light of the above teachings. It is therefore to be understood that within the scope of the appended claims, the invention may be practiced otherwise than as specifically described herein.

I claim:

1. An analog input module for a controller, said analog input module comprising:

an analog-to-digital converter having an input and an output thereof; and an input circuit comprising an output terminal connected to said input of said analog-to-digital converter, a voltage input terminal, a current input terminal, and a common terminal; said input circuit configured to accept a voltage input between said voltage input terminal and said common terminal, accept a current input between said current input terminal and said common terminal, and provide an output voltage at said output terminal dependent upon either said voltage input or said current input without switching therebetween.

2. The analog input module according to claim 1, wherein:

said input circuit comprises first, second and third resistors, each of said resistors arranged in series with one another;

each of said first, second and third resistors having a first end and a second end;

said voltage input terminal connected to said first end of said first resistor;

said current input terminal connected to said second end of said second resistor and to said first end of said third resistor;

said common terminal connected to said second end of said third resistor; and said output terminal connected to said second end of said first resistor and to said first end of said second resistor.

3. The analog input module according to claim 2, further comprising:

a voltage supply rail;

a first diode connected between said voltage supply rail and said input of said analog-to-digital converter so as to allow current flow only from said input of said analog-to-digital converter to said voltage supply rail; and a second diode connected between said input of said analog-to-digital converter and a ground so as to allow current flow only from said ground to said input of said analog-to-digital converter;

wherein said first and second diodes limit an input voltage applied to said input of said analog-to-digital converter.

4. The analog input module according to claim 3, further comprising:

an optical isolator connected to said output of said analog-to-digital converter;

a microcontroller connected to said optical isolator.

5. The analog input module according to claim 1, further comprising:

an optical isolator connected to said output of said analog-to-digital converter;

a microcontroller connected to said optical isolator.

6. The analog input module according to claim 1, wherein:

the input circuit comprises first, second and third resistors connected in series and connected to the voltage input terminal, the current input terminal and the common terminal.

7. An input circuit for an analog input module, said input circuit comprising:

a voltage input terminal;

a current input terminal;

a common terminal; and an output terminal;

said input circuit configured to accept a voltage input between said voltage input terminal and said common terminal, accept a current input between said current input terminal and said common terminal, and provide an output voltage at said output terminal dependent upon either said voltage input or said current input without switching therebetween.

8. The input circuit according to claim 7, further comprising:

first, second and third resistors, each of said resistors arranged in series with one another;

each of said first, second and third resistors having a first end and a second end;

said voltage input terminal connected to said first end of said first resistor;

said current input terminal connected to said second end of said second resistor and to said first end of said third resistor;

said common terminal connected to said second end of said third resistor; and said output terminal connected to said second end of said first resistor and to said first end of said second resistor.

9. The input circuit according to claim 8, further comprising:

a voltage supply rail;

a first diode connected between said voltage supply rail and said output terminal so as to allow current flow only from said output terminal to said voltage supply rail; and a second diode connected between said output terminal and a ground so as to allow current flow only from said ground to said output terminal;

wherein said first and second diodes limit said output voltage at said output terminal.

10. The analog input module according to claim 7, wherein:

the input circuit comprises first, second and third resistors connected in series and resistors connected to the voltage input terminal, the current input terminal and the common terminal.

11. An analog input module for a controller, said analog input module comprising:

means for processing signals from external means for sensing;

means for converting said signals from analog to digital form; and an output of said means for processing signals connected to said means for converting said signals from analog to digital form;

wherein said means for processing signals is provided with voltage input means, current input means, and signal return means;

said means for processing signals includes means for accepting a voltage input between said voltage input means and said signal return means, means for accepting a current input between said current input means and said signal return means, and means for providing an output voltage at said output means dependent upon either said voltage input or said current input without switching therebetween.

12. The analog input module according to claim 11, wherein:

said means for processing signals comprises first, second and third impedance means, each of said impedance means arranged in series with one another;

each of said first, second and third impedance means having a first end and a second end;

said voltage input means connected to said first end of said first impedance means;

said current input means connected to said second end of said second impedance means and to said first end of said third impedance means;

said signal return means connected to said second end of said third impedance means; and said output of said means for processing said signals connected to said second end of said first impedance means and to said first end of said second impedance means.

13. The analog input module according to claim 12, further comprising:

means for supplying a voltage;

first clamping means connected between said means for supplying a voltage and said input of said means for converting signals from analog to digital form so as to allow current flow only from said input of said means for converting signals from analog to digital form to said means for supplying a voltage; and second clamping means connected between said input of said means for converting signals from analog to digital form and a ground so as to allow current flow only from said ground to said input of said means for converting signals from analog to digital form;

wherein said first and second clamping means limit an input voltage applied to said means for converting signals from analog to digital form.

14. The analog input module according to claim 13, further comprising:

means for providing optical isolation connected to said output of said means for converting signals from analog to digital form;

a microcontroller connected to said means for providing optical isolation.

15. The analog input module according to claim 11, wherein:

the means for processing signals comprises first, second, and third impedance means connected in series and connected to the voltage input means, the current input means, and the signal return means.

16. An apparatus for processing signals from external sensors for an analog input module, said apparatus comprising:

voltage input means;

current input means;

signal return means;

output means;

means for accepting a voltage input between said voltage input means and said signal return means;

means for accepting a current input between said current input means and said signal return means; and means for providing an output voltage at said output means dependent upon either said voltage input or said current input without switching therebetween.

17. The means for processing signals according to claim 16, further comprising:

first, second and third impedance means, each of said impedance means arranged in series with one another;

each of said first, second and third impedance means having a first end and a second end;

said voltage input means connected to said first end of said first impedance means;

said current input means connected to said second end of said second impedance means and to said first end of said third impedance means;

said signal return means connected to said second end of said third impedance means; and said output means connected to said second end of said first impedance means and to said first end of said second impedance means.

18. The means for processing signals according to claim 17, further comprising:

means for supplying a voltage;

first clamping means connected between said means for supplying a voltage and said output means so as to allow current flow only from said output means to said means for supplying a voltage; and a second clamping means connected between said output means and a ground so as to allow current flow only from said ground to said output means;

wherein said first and second clamping means limit an output voltage at said output means.

19. The analog input module according to claim wherein:

the means for processing signals comprises first, second, and third impedance means connected in series and connected to the voltage input means, the current input means, and the signal return means.

* * * * *